US006351705B1

(12) United States Patent
Yoshioka

(10) Patent No.: US 6,351,705 B1
(45) Date of Patent: Feb. 26, 2002

(54) NAVIGATION SYSTEM HAVING A PLURALITY OF DISPLAYS

(75) Inventor: Kazunori Yoshioka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/366,653

(22) Filed: Aug. 4, 1999

(30) Foreign Application Priority Data

Apr. 9, 1999 (JP) ............................................. 11-102925

(51) Int. Cl.[7] ............................................. G06F 165/00
(52) U.S. Cl. ........................ 701/200; 701/211; 340/461; 340/990; 345/1.1
(58) Field of Search ................................. 701/200, 208, 701/211, 212; 340/438, 439, 461, 463, 990, 995; 345/1.1

(56) References Cited

FOREIGN PATENT DOCUMENTS

| JP | 6-103499 | | 4/1994 |
| JP | 6161396 | * | 6/1994 |
| JP | 7234633 | * | 9/1995 |
| JP | 9113289 | * | 5/1997 |
| JP | 9-113298 | | 5/1997 |
| JP | 9126786 | * | 5/1997 |
| JP | 9153195 | * | 6/1997 |
| JP | 9184729 | * | 7/1997 |
| JP | 11055601 | * | 2/1999 |

* cited by examiner

Primary Examiner—Gertrude Arthur

(57) ABSTRACT

A navigation system having a plurality of displays for displaying, for example, output images of a navigation system, output images of a television system, and output texts of a multiplex FM character broadcasting. Such a navigation system in the prior art has drawbacks that a large amount of calculations is required for detecting whether the vehicle is moving or not and for imposing restrictions on the sort of data to be displayed in the second display, installed at a position where the driver can see it. This problem is solved by a navigation system comprising: a first display 2 installed at a position where the driver cannot see it, a second display 3 installed at a position where the driver can see it, a VRAM 10 for storing data to be displayed in each of the displays, a blank signal generating circuit 12 disposed between the VRAM and the second display, and a control device 4 for calculating data to be displayed in the displays on the basis of the data from data input means and for storing the result into the VRAM, wherein the control device 4 detects whether the vehicle is moving or not, and when the vehicle is moving, the control device 4 controls the blank signal generating circuit so as to impose restrictions on the sort of the data to be displayed in the second display.

6 Claims, 4 Drawing Sheets

NAVIGATION SYSTEM HAVING A PLURALITY OF DISPLAYS

BACKGROUND OF THE INVENTION

1. Field of the Invention

The present invention relates to a navigation system having a plurality of displays for displaying, for example, output images of a navigation system, output images of a television system, and output texts of a multiplex FM (frequency modulated) character broadcasting.

2. Description of the Prior Art

FIG. 6 is a plan view of a vehicle 101, in which a plurality of displays are installed. Reference numeral 102 denotes a first display installed at a position where the driver of the vehicle cannot see it, for example, it is installed at a position where only the passengers sitting on the back seat can see it, as shown in this figure. Reference numeral 103 denotes a second display installed at a position where the driver of the vehicle can see it, for example, it is installed in a dash-board of the vehicle, as shown in the figure.

FIG. 7 is a block diagram of a navigation system having the first and second displays 102 and 103 for displaying image information. The system includes a control device (calculator) 104, for example, a CPU, connected with a GPS receiver 105 for receiving signals from satellites, a map data memory 106 storing geographical information data, an input device 107 for inputting necessary data, a gyro-sensor 108 for detecting the moving direction of the vehicle, and a velocity sensor 109 for detecting the velocity of the vehicle.

Output terminals of the control device 104 are connected with a first VRAM 110 and a second VRAM 112, for storing the data calculated in the control device 104. The first VRAM 110 is connected with the first display 102 through an output buffer 111. The second VRAM 112 is connected with the second display 103 through an output buffer 113.

The function of this system is explained below.

The driver of the vehicle inputs data regarding a destination into the control device 104, using the input device 107. The control device calculates the present position on the basis of the signals obtained through the GPS receiver 105, or on the basis of the outputs signals of the gyro-sensor 108 and/or of the velocity sensor 109. The control device searches a route to the destination position, referring to data read from the map data memory 106. The obtained data regarding the route is stored in the first and second VRAMs 110 and 112. Then the route is displayed on the first and second displays through the output buffers 111 and 113.

Command indications 102a 103a, such as a menu, a screen changing command indication, a destination position setting command indication, a surrounding facilities information getting (acquisition) command indication, a selection command indication for selecting a function of the multiplex FM character broadcasting are displayed at a part of the screen of the first and second displays 102 and 103. Using these command indications 102a, 103a, the control device can be controlled so that the data to be displayed in each screen can be changed.

When a vehicle is moving, it is required that the data to be displayed in the second display 103, which is installed at a position where the driver can see it, cannot or must not be changed from a point of view of the safety of driving. A passenger other than the driver may want to change the data to be displayed in the first display, while the vehicle is moving. However, a change of the data to be displayed in the first display 102 by a passenger other than the driver causes no problem in driving safety. Thus, a general prohibition in changing data to be displayed in both of the displays while the vehicle is moving is not reasonable. Under such circumstances, the vehicle would have to stop for every change of the data to be displayed, which is not practical.

To avoid this problem, the system in the prior art is so designed that the control device judges whether the vehicle is moving or stopped, and controls the VRAMs 110 and 112 in a time sharing manner so as to store different data in each of the VRAMs 110 and 112. The stored data are displayed in the first and/or second displays through the output buffers 111, 113.

Such an aforementioned navigation system in the prior art has the drawbacks that, a large amount of calculation in the control device 104 is required for controlling a plurality of the VRAMs in a time sharing manner so as to store different data in each of them, in order that the data to be displayed in each of the first and second displays can be changed independently. And the amount of the calculation increases according to the number of the VRAMs, therefore, the processing time in the control device is accordingly increased.

SUMMARY OF THE INVENTION

An object of the present invention is to eliminate the drawbacks in such a navigation system as in the prior art.

Another object of the present invention is to propose a navigation system in which the data to be displayed in the first display, installed at a position where the driver can not see it, can be changed by passengers other than the driver freely, while the vehicle is moving, without increasing the time required for treating the VRAM according to the number of the displays.

The object is attained by a navigation system according to the present invention, imposing restrictions on the sort of the data to be displayed in the second display while the vehicle is moving.

More precisely, the object is attained by a navigation system, according to the present invention, comprising a first display installed at a position where the driver cannot see it, a second display installed at a position where the driver can see it, a VRAM for storing data to be displayed in each of the displays, a blank signal generating circuit disposed between the VRAM and the second display, and a control device for calculating the data to be displayed in the displays on the basis of data inputted through data inputting means and for storing the result into the VRAM, wherein when the control device detects that the vehicle is moving, the control device controls the blank signal generating circuit so as to restrict the data to be displayed in the second display.

In an embodiment of the navigation system according to the present invention, command indications can be displayed at a part of the screen of the first and second displays, however the display of command indications in the second display is suppressed, while the vehicle is moving. The suppression of the display is performed by an output signal of the blank signal generating circuit.

In an embodiment of the present invention, while the vehicle is moving, only the background color of the screen, for example, black color, is displayed at the part of the screen of the second display where such command indications can be indicated.

Such black background bit signals can be obtained, for example, as a logical product or logical sum of the bit signal of the data from the VRAM and the output of the blank signal generating circuit, when the output of the blank signal generating circuit is constant, for example, LOW or HIGH.

DETAILED DESCRIPTION OF THE PREFERRED EMBODIMENT

Figure 1:
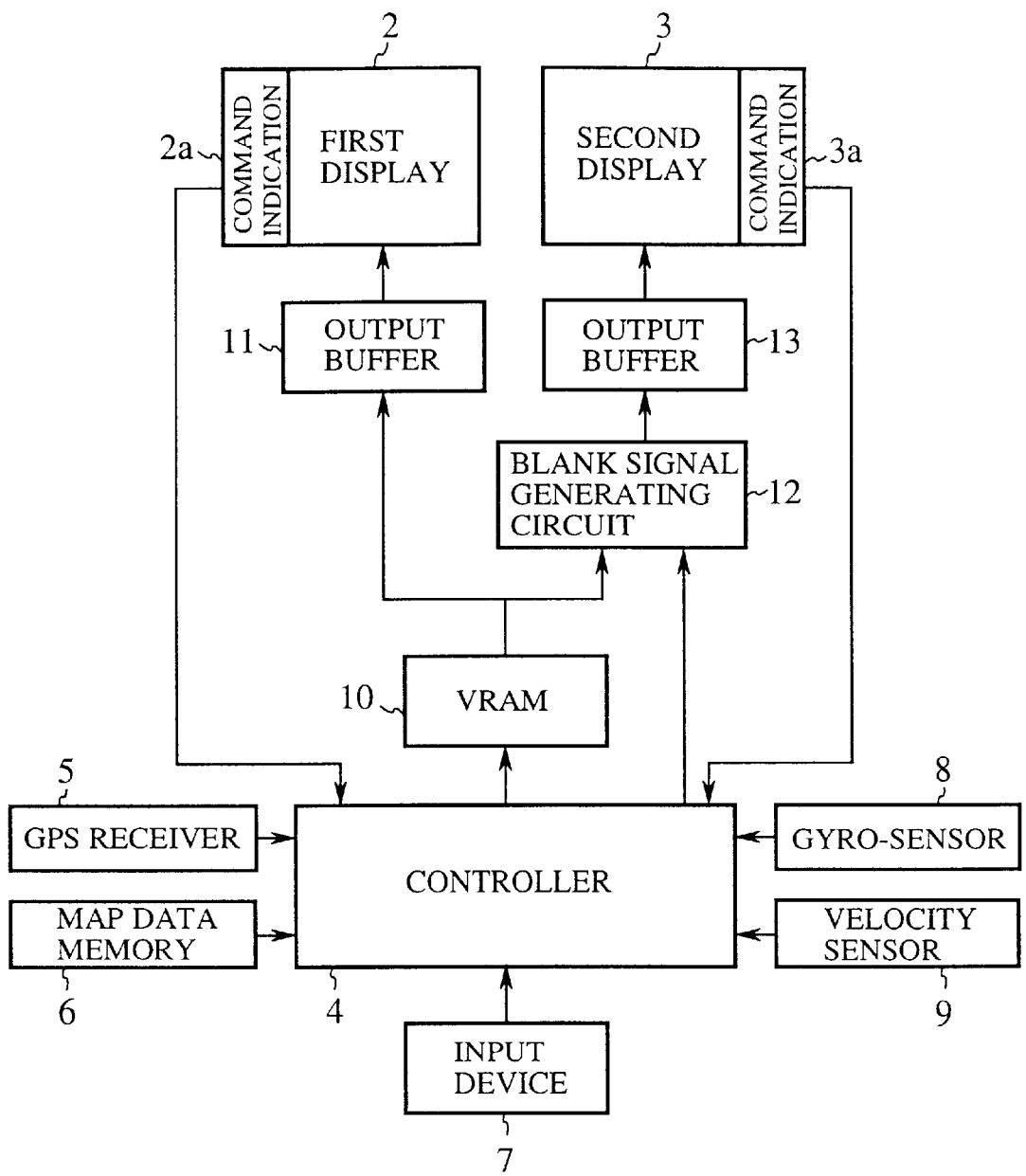
FIG. 1 is a block diagram of a navigation system, according to an embodiment of the present invention.

In FIG. 1, reference numeral 2 denotes a first display installed at a position where the driver of the vehicle cannot see it. For example, it is installed at a position where only passengers, other than the driver, sitting on the back seat can see it, as shown in the figure. Reference numeral 3 denotes a second display installed at a position where the driver of the vehicle can see it, for example, it is installed in a dash board of the vehicle, as shown in the figure.

Reference numeral 4 denotes a control device, as an calculation device comprised of a CPU, for example. The control device 4 is connected with a GPS receiver 5 for receiving signals from satellites, a map data memory 6 storing geographical information data, an input device 7 for inputting necessary data, a gyro-sensor 8 for detecting the direction of the movement of the vehicle, and a velocity sensor 9 for detecting the velocity of the vehicle.

An output of the control device 4 are connected with a VRAM 10 for holding data calculated in the control device 4. An output of the VRAM 10 is connected with the first and second displays 2 and 3. The first display 2 is connected with the VRAM through an output buffer 11, and the second display 3 is connected with the VRAM through a blank signal generating circuit 12 and another output buffer 13.

The function of the navigation system is explained below.

The driver of the vehicle inputs data regarding the destination position using the input device 7 into the control device 4. The control device 4 calculates the present position of the vehicle on the basis of the signals obtained through the GPS receiver 5, or on the basis of the outputs signals from the gyro-sensor 8 and/or the velocity sensor 9. The control device 4 searches a route to the destination position, referring to the data read from the map data memory 6.

The obtained route is stored in the VRAM 10. The data is sent from the VRAM 10 to the first display 2 as RGB signals A through the output buffers 11 so that the route is displayed in the first display 11. The data is sent also to the second display 3 from the VRAM 10 as RGB signals B through the blank signal generating circuit 12 and the output buffer 13 so that the searched route is displayed in the second display 3.

Figure 5:
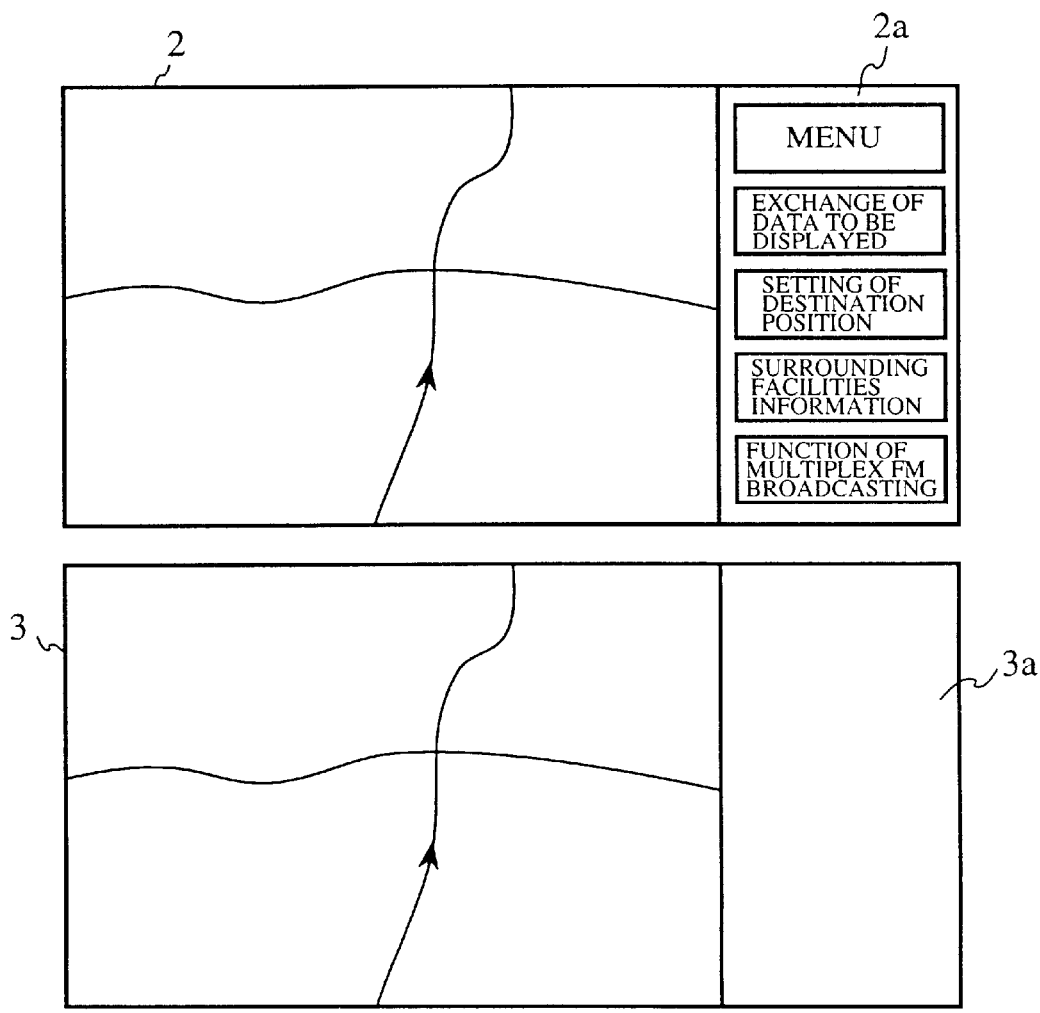
FIG. 5 shows an example of the displays in the first and second displays, displaying the command indications in the first display, and not displaying the command indications in the second display.
Figure 6:
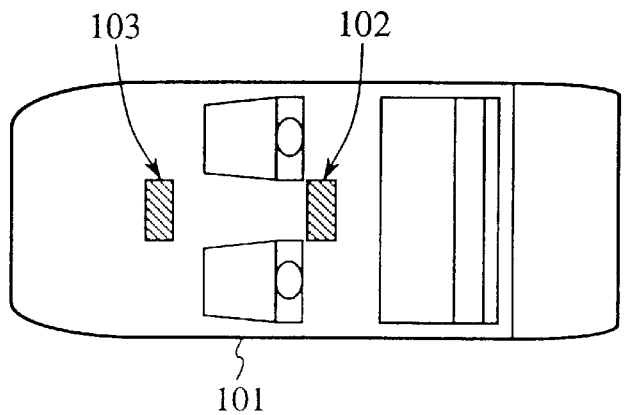
FIG. 6 is a plan view of a vehicle, in which a plurality of displays are installed.
Figure 7:
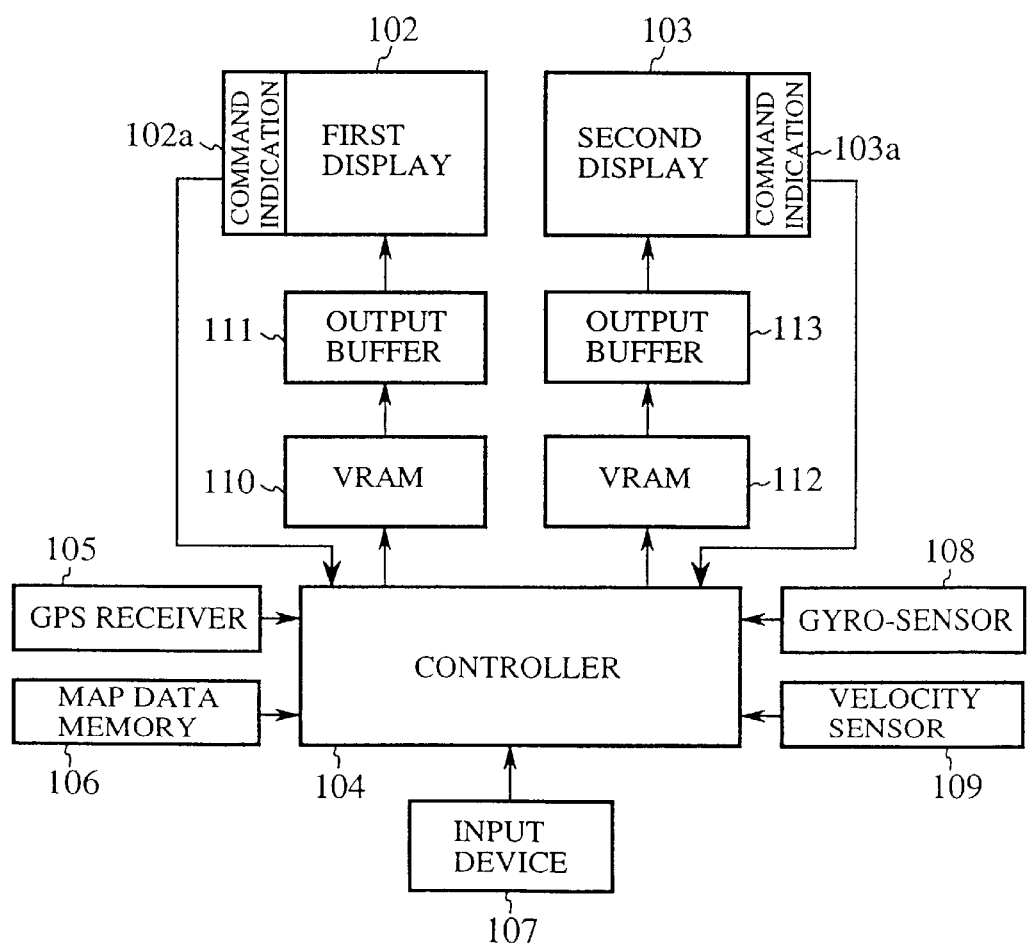
FIG. 7 is a block diagram of a navigation system in the prior art having a plurality of displays.

In this state, command indications 2a, 2b, for example, a menu, a screen exchanging command indication, a destination position setting command indication, a surrounding facilities information getting command indication, a selection command indication for selecting a function of multiplex FM character broadcasting, are displayed at a part of the screens of the first and second displays 2 and 3, as shown in the upper figure of FIG. 5. Using these command indications 2a, 3a, the control device 4 can be controlled so that the data to be displayed in each screen can be changed. This change can be carried out, for example, by disposing a transparent touch sensor (an operation input means) at an area corresponding to the area of the command indications 2a, 3a in the screens of the first and second displays 2, 3, and by touching a position corresponding to the selected command in the touch sensor with a finger. The operation input means can be the input means 7. However, it is preferable that the operation input means is provided independently from the input means 7.

Figure 2:
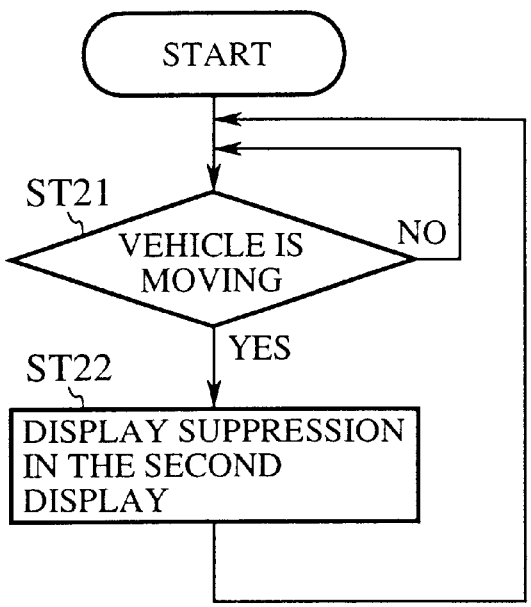
FIG. 2 is a flow chart for the display suppression of data to be displayed in the second display.
Figure 3:
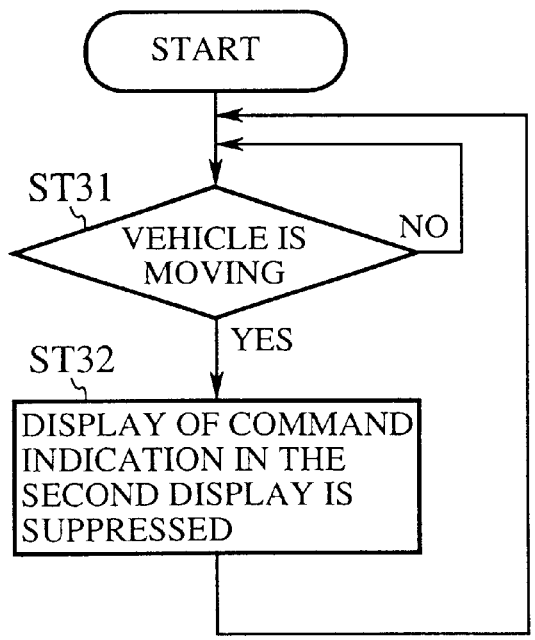
FIG. 3 is a flow chart for the display suppression of the instruction indication in the second display.

The control device 4 judges whether the vehicle is moving or not, on the basis of the output signal from the velocity sensor 9 (step ST 21). When the vehicle is moving, the control device 4 imposes restriction on the sort of data to be displayed in the second display 3 (step ST 22) as shown in FIG. 2. For example, when the control device 4 judges that the vehicle is moving (step ST 31), the display of the command indication 3a in the second display 3 is suppressed (step ST 32), as shown in FIG. 3.

In an embodiment, when the vehicle is moving, the blank signal generating device 12 generates a constant LOW or HIGH state signal, while RGB signals for displaying the command instruction in the second display are provided from the VRAM. And the logical product or the logical sum of the constant LOW or HIGH signal and the RGB signals is sent to the buffer 13.

Figure 4:
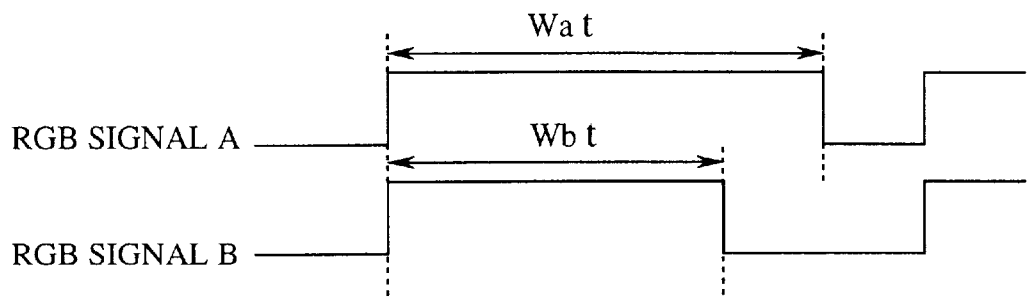
FIG. 4 is a timing chart of the RGB signal to be sent to the first and second displays.

Suppose that the horizontal dot number of the first display 2 is Wa, and the time length for displaying a unit dot in the first and second display 2,3 is t. RGB signals A are sent to the first display 2 through the output buffer 11 at a time length Wa×t to display the corresponding data, as shown in FIG. 4. Namely, as to the first display 2, no restriction is imposed on the sort of data to be displayed.

On the other hand, RGB signals are sent to the second display 3 through the output buffer 13 only at a time length Wb×t, where the reference Wb denotes the horizontal dot number in the second display 3 to be used for displaying, while the vehicle is moving.

For example, as shown in FIG. 5, command indications 2a, such as a menu, a screen changing command indication, a destination position setting command indication, a surrounding facilities information getting command indication, a selection command indication for selecting a function of multiplex FM character broadcasting are displayed at a part of the screen of the first displays 2a. There is no restriction on the sort of the data to be displayed. On the other hand, such command indications 3a are not displayed in the screen of the second display 3, namely the corresponding part is displayed as a black back ground. As a result, the data to be displayed in the second display cannot be changed. It is preferable to make the operation input means, for example, the touch sensor, of the second display 3, inactive, while the vehicle is moving.

The driver does not and cannot operate the second display 3, therefore, he can concentrate on the driving of the vehicle. This is preferable from the point of view of safety of driving. On the other hand, the command indications 2a are displayed in the first display 2, thus, the passengers, other than the driver, who are sitting beside the driver or on the back seat can select or operate the commands displayed in the first display 2 to change freely the data to be displayed.

As explained, according to this embodiment, the control device detects whether the vehicle is moving or not, and the control device controls the blank signal generating circuit 12 so as to impose restrictions on the sort of data to be displayed in the second display 3 installed at a position where the driver can see it. It is possible to display any sort of data in the first display installed at a position where the driver cannot see it with no restriction, while it is possible to impose restrictions on the sort of data to be displayed in the second display. This control can be performed promptly and accurately, without increasing the time required for treating the VRAM, which may increase according to the number of the displays.

The navigation system according to the present invention comprises a first display installed at a position where the driver cannot see it, a second display installed at a position where the driver can see it, a VRAM for storing data to be displayed in each of the displays, a blank signal generating circuit disposed between the VRAM and the second display, and a control device for calculating data to be displayed in the displays, on the basis of the data from data input means and for storing the result of the calculation into the VRAM, wherein the control device detects whether the vehicle is moving or not, and when the vehicle is moving, the control device controls the blank signal generating circuit so as to impose restrictions on the sort of the data to be displayed in the second display, thus, the navigation system has following advantages:

Only one VRAM is necessary independently of the number of the displays;

The reduction of number of the necessary components for production makes it possible to simplify the structure of the apparatus;

The data to be displayed in the second display can be easily restricted, by restricting a part of data to be sent from the VRAM to the second display through the blank signal generating circuit, as a result, the processing time required for imposing restrictions on the sort of data to be displayed in the second display 3 is shortened.

When command indications are not displayed in the second display during the moving of the vehicle, the driver cannot operate the second display to change the data to be displayed. Accordingly, the driver can concentrate on the driving of the vehicle. This is preferable for driving safety.

What is claimed is:

1. A navigation system having a plurality of displays comprising:

a first display installed at a position where the driver cannot see it, a second display installed at a position where the driver can see it, a single VRAM for storing data to be displayed in each of the displays, a blank signal generating circuit disposed between the VRAM and the second display, and a control device for calculating data to be displayed in the displays, on the basis of the data from data input means and for storing the result of the calculation into the VRAM, wherein the control device detects whether the vehicle is moving or not, and when the vehicle is moving, the control device controls the blank signal generating circuit so as to impose restrictions on the sort of the data to be displayed in the second display.

2. A navigation system having a plurality of displays according to claim 1, wherein command indications can be displayed at a part in the screen of the first and second displays, and the blank signal generating circuit suppresses the display of the command indications in the second display, while the vehicle is moving.

3. A navigation system having a plurality of displays according to claim 2, wherein the navigation system further comprises an output buffer disposed between the blank signal generating circuit and the second display, and when the vehicle is moving, the blank signal generating circuit generates a constant HIGH level output signal, while RGB signals to display the command indication in the second display are provided, the logical sum of the output of the blank signal generating circuit and the RGB signals is sent to the buffer.

4. A navigation system having a plurality of displays according to claim 2, wherein the navigation system further comprises an output buffer disposed between the blank signal generating circuit and the second display, and when the vehicle is moving, the blank signal generating circuit generates a constant LOW level output signal, while RGB signals to display the command indication in the second display are provided, the logical product of the output of the blank signal generating circuit and the RGB signals is sent to the buffer.

5. A navigation system having a plurality of displays according to claim 2, wherein each of the first and second displays comprise an operation input means at an area of the command indication.

6. A navigation system having a plurality of displays according to claim 5, wherein the operation input means of the second display is inactivated, while the vehicle is moving.

* * * * *